May 14, 1968

LEV ZALMANOVICH MADORSKY ET AL 3,383,583

DEVICE FOR AUTOMATIC FIELD CONTROL IN SYNCHRONOUS GENERATORS

Filed July 19, 1965

United States Patent Office 3,383,583
Patented May 14, 1968

3,383,583
DEVICE FOR AUTOMATIC FIELD CONTROL IN SYNCHRONOUS GENERATORS
Lev Zalmanovich Madorsky, Bolshoi Prospect B.O., 82, Kv. 113, and Jury Alexandrovich Nesterov, Basseinaya Ulitsa 71, Kv. 51, both of Leningrad, U.S.S.R.
Filed July 19, 1965, Ser. No. 472,919
3 Claims. (Cl. 322—25)

ABSTRACT OF THE DISCLOSURE

Synchronous generator with an automatic field control in which stator is coupled to the primary winding of current transformer which includes a secondary circuit controlled by controllable rectifiers.

This invention relates to devices for automatic field control in synchronous generators, and more specifically, to synchronous generators provided with controllable phase compounding.

Devices for automatic field control in synchronous generators provided with controllable phase compounding and comprising a current transformer having the primary, secondary and control windings are well known.

The aforementioned devices effect the D.C. control by means of the direct magnetic saturation of the current transformer magnetic circuit by varying the value of direct current which flows around the control windings thereof.

Other devices, also in current use for similar purposes, are provided with phase compounding, wherein current transformers have no control windings.

In such devices the A.C. control is effected by means of saturation chokes which are inserted either in the auxiliary winding or directly in the secondary winding of the current transformer and which control the output parameters by means of varying the magnetic saturation of the chokes.

Such devices, however possess a certain inertia which in many cases impedes the optimum transient process, in particular under conditions of sharp load variations. The aforesaid devices also necessitate the utilization of automatic regulators (voltage correctors) of higher capacity.

An object of this invention is to provide a device for automatic field control in synchronous generators, which device would insure high speed action and need less power by the control components and automatic regulators thereof.

According to this invention provision is made of a device wherein use is made of controllable means which are inserted in the secondary winding of the current transformer and in the control windings with the purpose of feeding the latter.

Figure 2:
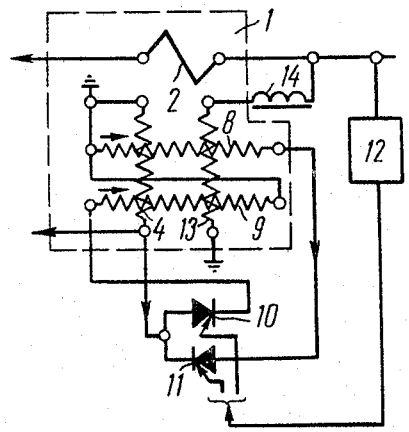
Figure 1:
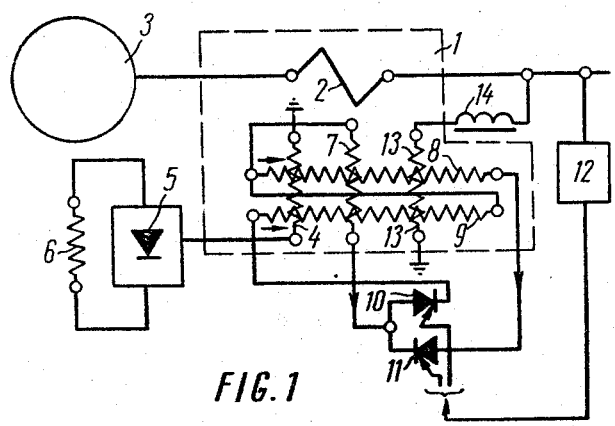

For a better understanding of this invention an embodiment thereof is described hereinbelow by way of example with reference to the accompanying drawings, wherein:

FIG. 1 is a schematic diagram of a device the control windings whereof are supplied from the auxiliary secondary winding of a current transformer; and FIG. 2 is a schematic diagram of the device the control windings whereof are supplied from the secondary winding of a current transformer.

As can be seen from FIG. 1, current transformer 1 contains primary and secondary circuits. The primary circuit includes a winding 2 which is inserted in the power circuit of generator stator 3 while the secondary circuit includes a winding 4 and auxiliary winding 7, the former being connected via rectifier 5 to field winding 6 of the generator rotor.

D.C. control windings 8 and 9 of current transformer 1 are respectively series connected to controllable rectifiers or transistors 10 and 11 which are connected in parallel opposition.

Control windings 8 and 9 are supplied via controllable transistors 10 and 11, either by auxiliary winding 7 (FIG. 1) or directly by secondary winding 4 (FIG. 2). In FIG. 2, auxiliary winding 7 may be dispensed with.

When controllable rectifiers 10 and 11 are adjusted by means of voltage corrector 12, the alternating current is varied either in winding 7 (FIG. 1) or winding 4 (FIG. 2), due to which fact the A.C. control is effected with a simultaneous current variation in control windings 8 and 9.

Winding 13 and inductive resistor 14 insure the obtaining of the required phase relationship during adjustment in the same manner as in known devices serving similar purposes.

The quick action of the device is attained by varying the intensity of D.C. magnetic saturation in each core of the transformer during either of the half-cycles of the supplied voltage.

Thus, both the D.C. and A.C. control permits to increase the sensitivity of the device and to make the control components and automatic regulators (voltage correctors) thereof less power-consuming.

What we claim is:

1. A device for automatic field control in a synchronous generator with controllable phase compounding and including a stator and a rotor field winding, said device comprising a current transformer including primary and secondary circuits respectively coupled to said stator and said winding and at least two control windings operatively associated with said circuits, and at least two controllable rectifiers connected to said secondary circuit of the current transformer and to said control windings for controllably supplying current to the latter, said controllable rectifiers each being triode type components including an anode, a cathode and a control electrode through which conductivity between the anode and cathode is controlled.

2. A device for automatic field control in a synchronous generator with controllable phase compounding and including a stator and a rotor field winding, said device comprising at least two parallel controllable rectifiers, a current transformer including at least two control windings, a primary winding coupled to said stator, and a secondary circuit coupled to said field winding, and an auxiliary secondary winding to supply said control windings via said controllable rectifier.

3. A device for automatic field control in a synchronous generator with controllable phase compounding and including a stator and a rotor field winding, said device comprising at least two parallel controllable rectifiers, a current transformer including at least two control windings, a primary winding coupled to said stator, a rectifier, a secondary winding connected via said rectifier to said field winding and via said controllable rectifiers to said control windings for supplying current to the latter.

References Cited
UNITED STATES PATENTS
3,032,699  5/1962  Kahle _____ 322—25 X
3,299,342  1/1967  Rath _____ 322—28

MILTON O. HIRSHFIELD, Primary Examiner.
J. D. TRAMMELL, Assistant Examiner.